(12) United States Patent
Cho

(10) Patent No.: US 9,179,253 B2
(45) Date of Patent: Nov. 3, 2015

(54) MAP SERVICE METHOD AND SYSTEM OF PROVIDING TARGET CONTENTS BASED ON LOCATION

(71) Applicant: NAVER Corporation, Seongnam-Si, Gyeonggi-Do (KR)

(72) Inventor: KyongMin Cho, Seongnam-si (KR)

(73) Assignee: NAVER CORPORATION, Gyeonggi-Do (KR)

( * ) Notice: Subject to any disclaimer, the term of this patent is extended or adjusted under 35 U.S.C. 154(b) by 53 days.

(21) Appl. No.: 14/083,880

(22) Filed: Nov. 19, 2013

(65) Prior Publication Data

US 2014/0141812 A1 May 22, 2014

(30) Foreign Application Priority Data

Nov. 19, 2012 (KR) ........................ 10-2012-0131039

(51) Int. Cl.
| | |
|---|---|
| *H04W 4/02* | (2009.01) |
| *H04W 4/04* | (2009.01) |
| *G06F 17/30* | (2006.01) |
| *G06Q 30/02* | (2012.01) |

(52) U.S. Cl.
CPC ........... *H04W 4/02* (2013.01); *G06F 17/30241* (2013.01); *G06Q 30/02* (2013.01); *H04W 4/022* (2013.01); *H04W 4/04* (2013.01)

(58) Field of Classification Search
CPC .......... H04W 4/02; H04W 4/022; H04W 4/04
USPC ................ 455/456.3, 456.1, 456.6, 414.1
See application file for complete search history.

(56) References Cited

U.S. PATENT DOCUMENTS

| | | | | |
|---|---|---|---|---|
| 2004/0204842 A1* | 10/2004 | Shinozaki | ...................... | 701/209 |
| 2005/0192025 A1* | 9/2005 | Kaplan | ...................... | 455/456.1 |
| 2006/0149466 A1* | 7/2006 | Kikuchi et al. | ................ | 701/211 |
| 2008/0268830 A1* | 10/2008 | Sharma et al. | ................ | 455/421 |
| 2009/0262071 A1* | 10/2009 | Yoshida | ........................ | 345/157 |
| 2011/0055204 A1 | 3/2011 | Jung | | |
| 2011/0283223 A1* | 11/2011 | Vaittinen et al. | ............... | 715/781 |

FOREIGN PATENT DOCUMENTS

| | | |
|---|---|---|
| JP | 2009-330329 | 12/1997 |
| JP | 10-105357 | 4/1998 |
| JP | 2004-340724 A | 12/2004 |

(Continued)

OTHER PUBLICATIONS

Martin Piolet (PocketNavigator: Vibro-Tactile Waypoint Navigation for Everyday Mobile Devices, Sep. 7-10, 2010).*

(Continued)

*Primary Examiner* — Khai M Nguyen
(74) *Attorney, Agent, or Firm* — Harness, Dickey & Pierce, PLC

(57) ABSTRACT

Provided is a map service system and method for providing target content based on a location and/or position of a user device. The map service method includes identifying a pointer associated with a user device, the pointer indicating a position of the user device on a map. The method includes providing a spot finder in response to a position of the pointer, the spot finder having a desired radius based on a position of the pointer. The method includes providing a target content in the desired radius, the target content corresponding to a location within the desired radius.

31 Claims, 10 Drawing Sheets

(56) References Cited

FOREIGN PATENT DOCUMENTS

| | | |
|---|---|---|
| JP | 2005-345223 A | 12/2005 |
| JP | 2006-024196 A | 1/2006 |
| JP | 2009-114851 A | 5/2009 |
| JP | 2009-145935 A | 7/2009 |
| JP | 2009-186899 A | 8/2009 |
| JP | 2010-282526 A | 12/2010 |
| JP | 2010-286366 A | 12/2010 |
| JP | 2011-141340 A | 7/2011 |
| JP | 2012-146276 A | 8/2012 |
| KR | 2006-0025288 A | 3/2006 |

OTHER PUBLICATIONS

Korean Office Action dated Mar. 27, 2014 in corresponding Application No. 10-2012-0131039.

Chiba Haruka, the strongest search site Google's genuinely useful use, Nikkei Zero One Easy, Japan, Nikkei Home publisher, Nov. 1, 2005, vol. 113, p. 82-83.

Japanese Office Action dated Oct. 7, 2014 in corresponding Japanese Application No. 2013-236610.

* cited by examiner

MAP SERVICE METHOD AND SYSTEM OF PROVIDING TARGET CONTENTS BASED ON LOCATION

CROSS-REFERENCE TO RELATED APPLICATION

This application claims priority from and the benefit of Korean Patent Application No. 10-2012-0131039, filed on Nov. 19, 2012, which is hereby incorporated by reference in its entirety for all purposes as if fully set forth herein.

BACKGROUND

1. Field

Example embodiments relate to a map service method and system for providing target content based on a location.

2. Description of the Background

Currently, various types of map services are provided. Through a map service using a communication network such as a satellite communications network, a user may request a search for information and be provided with the search results without being limited to a space in a wireless communication environment of an electronic device, such as a personal computer (PC), a tablet PC, a mobile cellular phones (e.g., "smartphones"), and a navigation device, for example.

In this regard, a method of providing a map service on a terminal is disclosed in Korean Laid Open Publication No. 10-2006-0025288.

Currently, map services may place content on a map based on a text keyword entered into a keyword search form. An icon representing a geolocation of each search result from the keyword search may be placed on portions of the map according to the geolocation of each search result. In this case, data may appear as noise.

Also, the map services may logically display only principal search results on a map based on a search ranking in a case in which a relatively large amount of search results is acquired, and may display the entire search results located at far distances on the map by down-scaling the map (or "zooming out") in a case in which a relatively small amount of search results is acquired.

In the case of displaying the search results on a map as icons, a user of a map service may not readily obtain only search results about a region of interest desired to be searched, which results in decreasing interest of the user.

In addition, in a case in which a relatively large amount of search results is acquired, a relatively large amount of dead data, which logically ranks lower places and thus, is not included in the search results, may be present. In this case, there may be some constraints on the user obtaining a desired search result.

SUMMARY

At least one example embodiment provides a map service method for providing target content based on a location and/or position of a user device. At least one example embodiment provides a map service system configured to provide target content based on a location and/or position of a user device.

According to an example embodiment, a map service method is provided. The method includes identifying a pointer associated with a user device, the pointer indicating a position of the user device on a map. The method includes providing a spot finder in response to a position of the pointer, the spot finder having a desired radius based on the position of the pointer. The method includes providing a target content in the desired radius, the target content corresponding to a location within the desired radius.

Example embodiments provide that the location in the desired radius is defined by at least one of a coordinate of the target content, a description of the target content, and a venue of the target content.

Example embodiments provide that a marker may indicate the location in the desired radius.

Example embodiments provide that the desired radius is defined by a boundary encompassing at least one of a two-dimensional shape and a three-dimensional shape.

Example embodiments provide that the providing the target content may include providing a name associated with the target content in response to the pointer being proximate to the marker, and providing information associated with the target content in response to receiving a user input associated with the marker. The user input may include at least one of a click operation, a tap operation, a touch-and-drag operation, and the pointer being proximate to the marker for a desired period of time.

Example embodiments provide that the providing the information may include providing a link in response to receiving the user input, the link pointing to the information associated with the target content, and providing the information associated with the target content when the link is followed.

Example embodiments provide that the information associated with the target content includes at least one detail related to the target content. The at least one detail may include at least one of an address, a telephone number, public transportation information, recommended restaurant information, real estate information, and social networking service (SNS) information.

Example embodiments provide that the providing the target content may include searching for target content proximate to the spot finder using a hashing algorithm associated with the one or more locations.

Example embodiments provide that a plurality of target contents may be in the desired radius. Each of the plurality of target contents may be associated with a corresponding location in the desired radius, and the providing the target content may include providing a target contents list. The target contents list may include a number of the plurality of target contents in the desired radius and a name of each of the target contents in the desired radius. The target contents list may be provided in an area that is outside of the spot finder. The providing the target content may include providing a name of one of the plurality of target contents that is most proximate to a position of the pointer when the position of the pointer is on the target contents list.

Example embodiments provide that the providing the target contents list may include generating a category for each of the plurality of target contents, where each category includes a user-defined setting, and at least one of a recommended restaurant, an SNS, and a real estate. The providing the target contents list may include providing the target contents of the target contents list according to the user-defined setting.

Example embodiments provide that the providing the target content may further include determining that the number of target contents in the desired radius is greater than or equal to a desired reference value. The providing the target content may further include sequentially extracting target contents from the target contents list based on a proximity of each of the target contents of the target contents list to the position of the pointer. The amount of sequentially extracted target contents may be equal to the desired reference value. The providing the target content may further include providing the sequentially extracted target contents.

Example embodiments provide that the target contents of the target contents list that are displayed on a top portion of the target content list are more proximate to the position of the pointer than the target contents of the target content list that are less proximate to the position of the pointer. An amount of proximity of each of the target contents to the position of the pointer is expressed using at least one of a color or a bold font in the target contents list.

Example embodiments provide that the providing the spot finder includes providing a shortcut marker when at least two target contents correspond to one location within the spot finder. The providing the spot finder includes providing information of the at least two target contents that correspond to the shortcut marker when the position of the pointer is proximate to the shortcut marker. The providing the spot finder includes providing a target contents list that lists the at least two target contents that correspond to the shortcut marker. Each of the at least two target contents listed in the target contents list may include a corresponding link that, when followed, provide information associated with each of the at least two target contents.

Example embodiments provide that, when the at least two target contents associated with the shortcut marker is greater than or equal to a desired reference value, the target contents list includes a scrolling function.

Example embodiments provide that the providing the spot finder includes displaying a desired search location on the map according to a position of the pointer on the map using a touch-and-drag operation.

According to an example embodiment, a non-transitory computer-readable recording medium that may store program code for controlling a computer system to, when executed, implement a map service method is provided. The method includes providing a spot finder in response to a position of the pointer, the spot finder having a desired radius based on the position of the pointer. The method includes providing a target content in the desired radius, the target content corresponding to a location within the desired radius.

According to an example embodiment, a map service server is provided. The map service server includes a processor. The processor is configured to execute a query identifier to identify a pointer associated with a user device, the pointer indicating a position of the user device on a map. The processor is configured to execute a spot finder provider to provide a spot finder in response to a position of the pointer, the spot finder having a desired radius based on the position of the pointer, and provide a target content in the desired radius, the target content corresponding to a location within the desired radius.

Example embodiments provide that the location in the desired radius is defined by at least one of a coordinate of the target content, a description of the target content, and a venue of the target content.

Example embodiments provide that a marker may indicate the location in the desired radius.

Example embodiments provide that the desired radius is defined by a boundary encompassing at least one of a two-dimensional shape and a three-dimensional shape.

Example embodiments provide that, in the providing the target content, the processor is further configured to provide a name associated with the target content in response to the pointer being proximate to the marker, and provide information associated with the target content in response to receiving a user input associated with the marker. The user input may include at least one of a click operation, a tap operation, a touch-and-drag operation, and the pointer being proximate to the marker for a desired period of time.

Example embodiments provide that, in the providing the information, the processor is further configured to provide a link in response to receiving the user input, the link pointing to the information associated with the target content, and provide the information associated with the target content when the link is followed.

Example embodiments provide that the information associated with the target content includes at least one detail related to the target content. The at least one detail may include at least one of an address, a telephone number, public transportation information, recommended restaurant information, real estate information, and social networking service (SNS) information.

Example embodiments provide that the providing the target content may include searching for target content proximate to the spot finder using a hashing algorithm associated with the one or more locations.

Example embodiments provide that a plurality of target contents may be in the desired radius. Each of the plurality of target contents may be associated with a corresponding location in the desired radius, and in the providing the target content, the processor is further configured to provide a target contents list. The target contents list may include a number of the plurality of target contents in the desired radius and a name of each of the target contents in the desired radius. The target contents list may be provided in an area that is outside of the spot finder. The processor is further configured to provide a name of one of the plurality of target contents that is most proximate to a position of the pointer when the position of the pointer is on the target contents list.

Example embodiments provide that, in the providing the target contents list, the processor is further configured to generate a category for each of the plurality of target contents, where each category includes a user-defined setting, and at least one of a recommended restaurant, an SNS, and a real estate. The processor is further configured to provide the target contents of the target contents list according to the user-defined setting.

Example embodiments provide that, in the providing the target content, the processor is further configured to determine that the number of target contents in the desired radius is greater than or equal to a desired reference value. The processor is further configured to sequentially extracting target contents from the target contents list based on a proximity of each of the target contents of the target contents list to the position of the pointer. The amount of sequentially extracted target contents may be equal to the desired reference value. The processor is further configured to provide the sequentially extracted target contents.

Example embodiments provide that the target contents of the target contents list that are displayed on a top portion of the target content list are more proximate to the position of the pointer than the target contents of the target content list that are less proximate to the position of the pointer. An amount of proximity of each of the target contents to the position of the pointer is expressed using at least one of a color or a bold font in the target contents list.

Example embodiments provide that, in the providing the spot finder, the processor is further configured to provide a shortcut marker when at least two target contents correspond to one location within the spot finder. The processor is further configured to provide information of the at least two target contents that correspond to the shortcut marker when the position of the pointer is proximate to the shortcut marker. The processor is further configured to provide a target contents list that lists the at least two target contents that correspond to the shortcut marker. Each of the at least two target contents listed in the target contents list may include a corresponding link that, when followed, provide information associated with each of the at least two target contents.

Example embodiments provide that, when the at least two target contents associated with the shortcut marker is greater than or equal to a desired reference value, the target contents list includes a scrolling function.

Example embodiments provide that, in the providing the spot finder, the processor is further configured to display a desired search location on the map according to a position of the pointer on the map using a touch-and-drag operation.

It is to be understood that both the foregoing general description and the following detailed description are explanatory and are intended to provide further explanation of the example embodiments as claimed.

BRIEF DESCRIPTION OF THE DRAWINGS

The accompanying drawings, which are included to provide a further understanding of the example embodiments and are incorporated in and constitute a part of this specification, illustrate example embodiments, and together with the description serve to explain the principles of the example embodiments.

DETAILED DESCRIPTION

Figure 1:
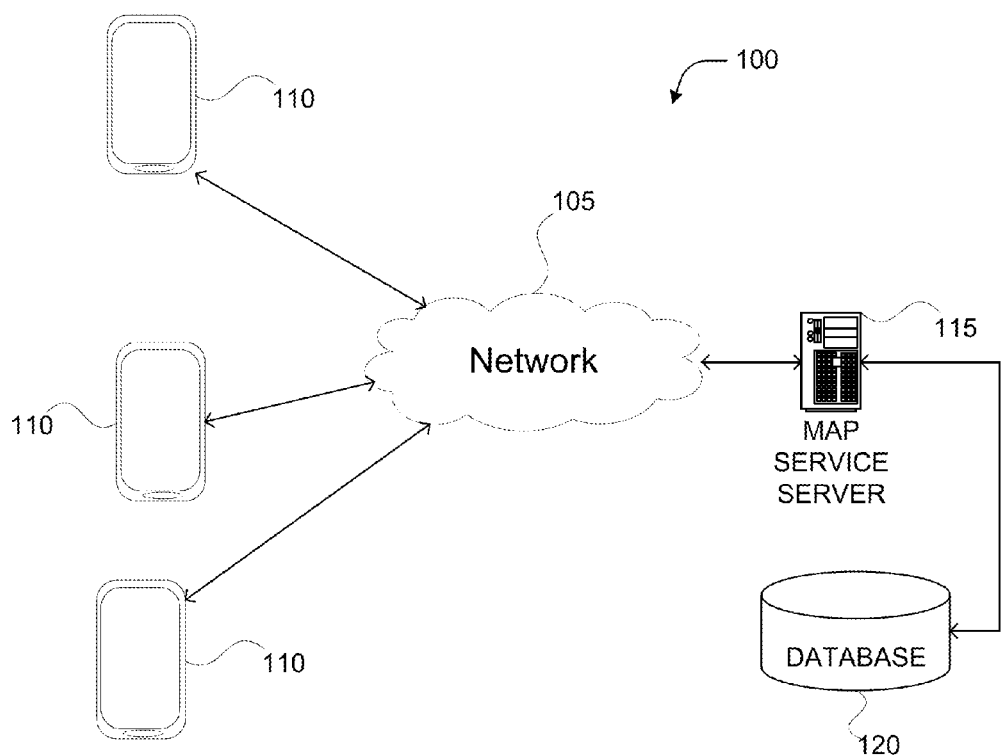
FIG. 1 illustrates an example of a communications network according to an example embodiment.

The example embodiments are described more fully hereinafter with reference to the accompanying drawings, in which example embodiments are shown. These example embodiments may, however, be embodied in many different forms and should not be construed as limited to the example embodiments set forth herein. Rather, the example embodiments are provided so that this disclosure is thorough, and will fully convey the scope to those skilled in the art. In the drawings, the size and relative sizes of layers and areas may be exaggerated for clarity. Like reference numerals in the drawings denote like elements.

Example embodiments will now be described more fully with reference to the accompanying drawings in which example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, the thicknesses of layers and areas are exaggerated for clarity. Like reference numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of areas illustrated herein but are to include deviations in shapes that result, for example, from manufacturing. For example, an implanted area illustrated as a rectangle will, typically, have rounded or curved features and/or a gradient of implant concentration at its edges rather than a binary change from implanted to non-implanted area. Likewise, a buried area formed by implantation may result in some implantation in the area between the buried area and the surface through which the implantation takes place. Thus, the areas illustrated in the figures are schematic in nature and their shapes are not intended to illustrate the actual shape of an area of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, a map service method and system according to example embodiments will be described with reference to the accompanying drawings.

According to example embodiments, a location or geolocation may be a principal entity of a query to display target content on a map. Accordingly, a user interface capable of displaying content on a map without requiring input of a text keyword is be provided. Also, an existing map service based on a text keyword may be provided.

According to example embodiments, a user interface is provided that is capable of displaying target content by using a location or geolocation as an entity of a query instead of using a text keyword to search a map provided on an electronic device.

Also, according to example embodiments, a map service method and system is provided that may prevent data from appearing as noise due to small icons deployed on a displayed map, may increase a level of concentration about a region of interest through a user interaction, and may also enhance accuracy in displaying search results about a desired search location of the user.

Also, according to example embodiments, a map service method and system is provided that may display search results by reducing a user request section in order to meaningfully generate logically dead data by search rankings (e.g., data having a relatively low rank), and thus, is not displayed as the search results.

FIG. 1 illustrates an example of a communications network, according to an example embodiment. A communications network 100 includes terminals 110, map service server 115, database 120, and network 105.

According to various embodiments, terminals 110 may be a hardware computing device capable of communicating with a server (e.g., map service server 115), such that each of the terminals 110 are able to receive services from the server. Terminals 110 may include memory, one or more processors, and transceiver. Terminals 110 may be configured to send/receive data to/from network devices, such as a router, switch, or other like network devices, via a wired or wireless connection. Terminals 110 may be designed to sequentially and automatically carry out a sequence of arithmetic or logical operations; equipped to record/store digital data on a machine readable medium; and transmit and receive digital data via one or more network devices. In various embodiments, terminals 110 may include laptops, desktop personal computers (PCs), tablet PCs, mobile cellular phones (e.g., "smartphones"), video cameras, digital photo cameras, MP3 players, and/or any other physical or logical device capable of capturing/recording, storing, and/or transferring data via network 105. Terminals 110 may include a wireless transceiver configured to operate in accordance with wireless communications standard.

Terminals 110 may be equipped with location (or alternatively "geolocation"), positioning, and/or navigation circuitry, such as a Global Positioning System ("GPS") receiver, as well as software to convert the received signals into a location and/or position (within some margin of error). In other embodiments, alternate positioning systems may be employed, such as wireless network signal-strength-based indoor positioning systems, hybrid systems combining global and local positioning systems, and/or other like positioning and/or location detection systems. However, in various embodiments, geolocation information may come from other sources including an IP address, Wi-Fi and/or Bluetooth MAC address, radio-frequency identification ("RFID"), Wi-Fi connection location, GSM/CDMA cell IDs, and the like.

According to various embodiments, map service server 115 may include a physical computer hardware system that is configured to provide services for client devices (e.g., terminals 110) connected to a network (e.g., network 105). Map service server 115 may employ one or more connection-oriented protocols such as Session Initiation Protocol (SIP), HTTP, and TCP/IP, and includes network devices that use connectionless protocols such as User Datagram Protocol (UDP) and Internet Packet Exchange (IPX). Map service server 115 may be configured to establish, manage, and terminate communications sessions, for example between the map service server 115 and one or more of the terminals 110. Map service server 115 may also be configured to establish, manage, and terminate communications sessions with two or more client devices.

In various embodiments, map service server 115 may provide interactive mapping and/or cartographic services to one or more client devices (e.g., terminals 110). In various embodiments, map service server 115 may perform the functions of cartographic data provider. In such embodiments, an interactive map may be provided by map service server 115 to one or more client devices (e.g., terminals 110). In some embodiments, a third-party cartographic data provider (not shown) may provide map service server 115 with mapping and/or cartographic data for the interactive mapping and/or cartographic services.

According to various embodiments, map service server 115 is connected to one or more local and/or remote databases 120. In various embodiments, database 120 may include a database management system ("DBMS"). Database 120 may include a relational database management system ("RDBMS") database. In other embodiments, alternate DBMS may also be used, such as an object database ("ODBMS"), column-oriented DBMS, correlation database DBMS, and the like. In various embodiments, database 120 may collect and/or store mapping and/or cartographic data for interactive mapping and/or cartographic services. Additionally, database 120 may be configured to receive location queries from map service server 115 and provide the mapping and/or cartographic data to the map service server 115 according to the received query.

In various embodiments, network 105 may be the Internet. In other embodiments, network 105 may be may be a Wide Area Network (WAN) or other like network that covers a broad area, such as a personal area network (PAN), local area network (LAN), campus area network (CAN), metropolitan area network (MAN), a virtual local area network, or other like networks capable of physically or logically connecting computers.

As shown in FIG. 1, three terminals 110, a single map service server 115, and a single database 120 are present. According to various embodiments, any number of client devices (e.g., terminals 110), multiple servers (e.g., map service server 115), and/or multiple databases (e.g., database 120) may be present. Additionally, in some embodiments, map service server 115 and database 120 may be virtual machines, and/or they may be provided as part of a cloud computing service.

Figure 2:
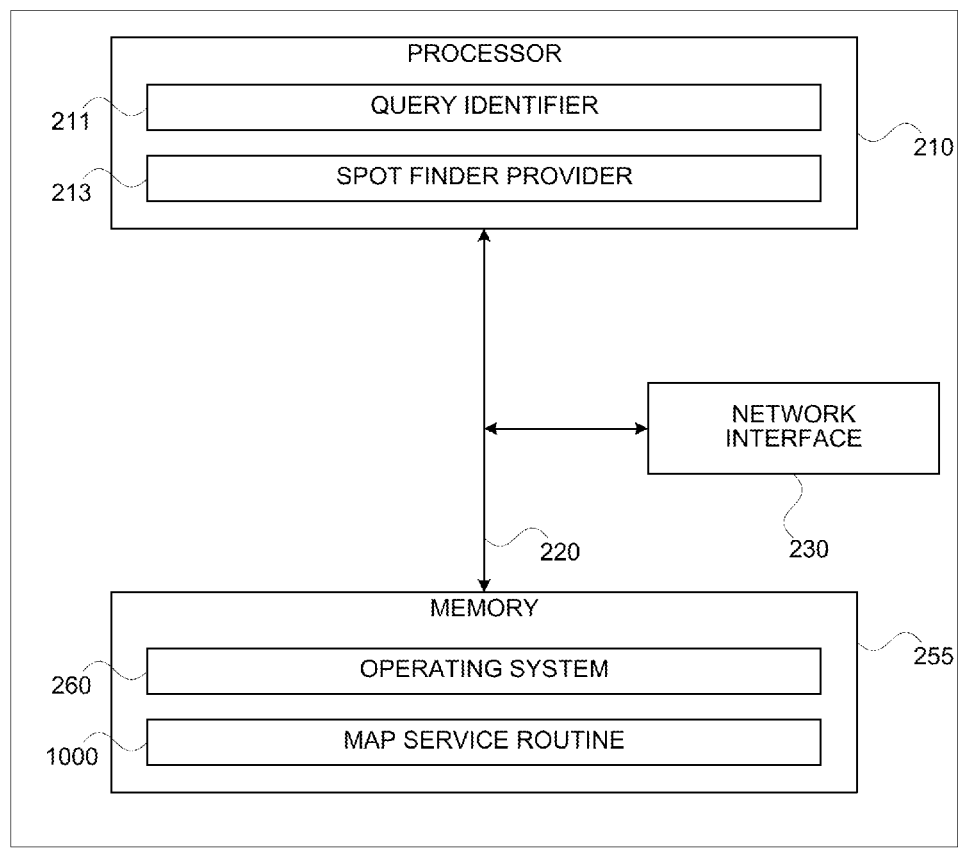
FIG. 2 illustrates the components of a network element being employed by a communication network according to an example embodiment.

FIG. 2 illustrates the components of map service server 115, according to an example embodiment. As shown, map service server 115 includes central processing 210, bus 220, network interface 230, and memory 255. During operation, memory 255 includes operating system 260 and map service routine 1000; and processor 210 includes query identifier 210, and spot finder 213. In some embodiments, map service server 115 may include many more components than those shown in FIG. 2. However, it is not necessary that all of these generally conventional components be shown in order to disclose the illustrative embodiment. For example, map service server 115 may also include a display, a transceiver, and/or other like components.

Memory 255 may be a computer readable storage medium that generally includes a random access memory (RAM), read only memory (ROM), and a permanent mass storage device, such as a disk drive. Memory 255 also stores operating system 260 and program code for map service routine 1000. These software components may also be loaded from a separate computer readable storage medium into memory 255 using a drive mechanism (not shown). Such separate computer readable storage medium may include a floppy drive, disc, tape, DVD/CD-ROM drive, memory card, or other like computer readable storage medium (not shown). In some embodiments, software components may be loaded into memory 255 via network interface 230, rather than via a computer readable storage medium.

Processor 210 may be configured to carry out instructions of a computer program by performing the basic arithmetical, logical, and input/output operations of the system. Instructions may be provided to processor 210 by memory 255 via bus 220, or by network interface 230 via bus 220. Processor 210 is configured to execute program code for query identifier 211 and spot finder provider 213. Such program code may be stored in a storage device (e.g., memory 255).

The query identifier 211 may identify a real-time location and/or position of a pointer as a location based query. Instead of using a text keyword, a location and/or position of the pointer may be used as an important query. The pointer may move to a desired search location on a map using a touch-and-drag operation, and the desired search location may be displayed accordingly. The query identifier 211 may recognize the above described event.

In response to the query, the spot finder provider 213 may provide a spot finder having a desired radius based on and/or around the pointer. The spot finder may be a space for displaying target content included in the desired radius at coordinates of a corresponding location using a marker type link and may be provided in a circular or polygonal shape based on coordinates.

According to example embodiments, when providing the spot finder, target content present within the spot finder may be found and displayed. In this example, a hashing algorithm associated with coordinates may be used to search for the target content.

When providing the spot finder, the number of found target contents and a list the found target contents may be displayed on an outside of the spot finder. When displaying a target content list, names of the target contents included in the list may be sequentially displayed in order of the target contents relatively proximate to a real-time location and/or position of the pointer, for example, in ascending order of distances between the target contents and the pointer.

In response to the pointer being rolled over or passing a marker, the spot finder provider 213 may display a name of target content corresponding to the marker. In response to the pointer being rolled over the marker for at least a desired (or alternatively, "predetermined") period of time, details of the target content may be displayed. Details of the target content may include a name, an address, a telephone number, and/or other like information.

Bus 220 enables the communication and data transfer between the components of map service server 115. Bus 220 may comprise a high-speed serial bus, parallel bus, storage area network (SAN), and/or other suitable communication technology.

Network interface 230 is a computer hardware component that connects map service server 115 to a computer network (e.g., network 105). Network interface 230 may connect map service server 115 to a computer network via a wired or wireless connection.

Figure 3:
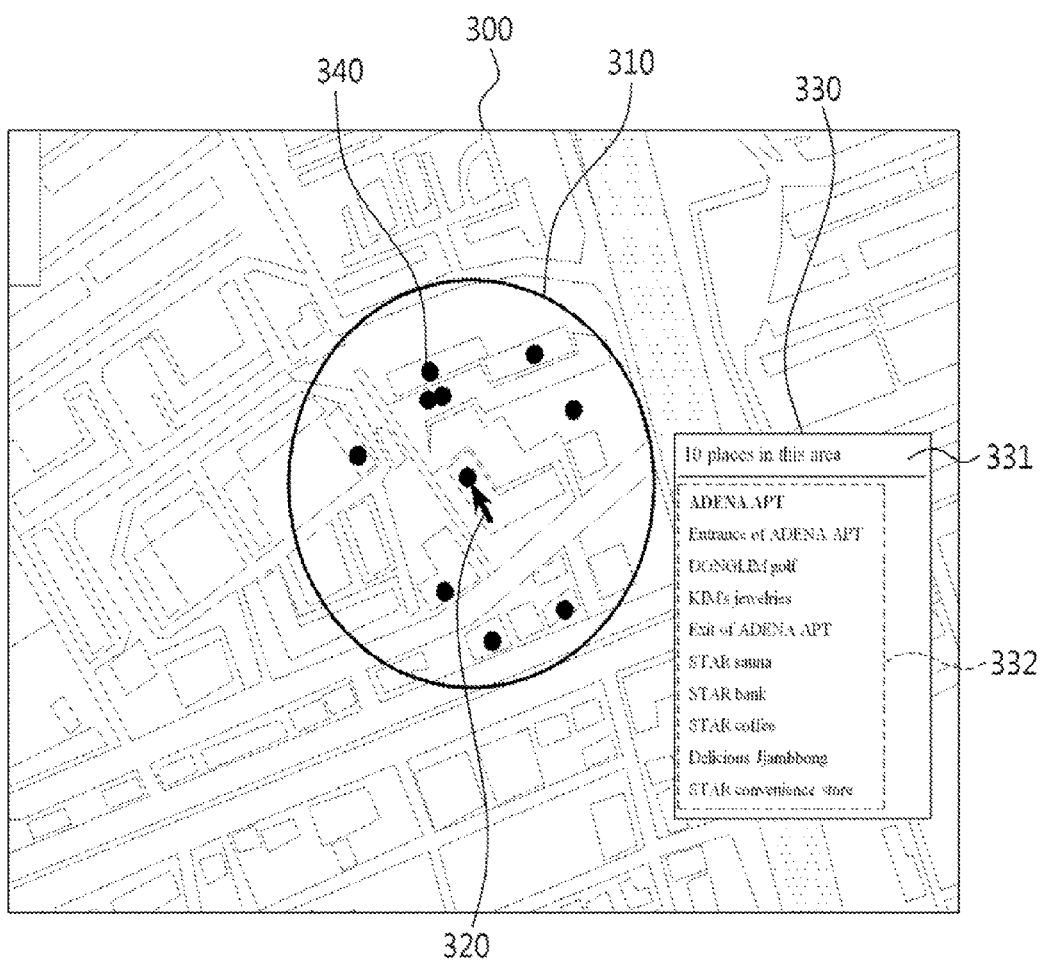
FIG. 3 illustrates an example of a map service providing a spot finder according to example embodiments.

FIG. 3 illustrates an example of providing a map service according to example embodiments. The map service may be provided by a map service system according to example embodiments. Referring to FIG. 3, a spot finder 310 is provided on a displayed map 300 and the spot finder 310 may be provided in a circular or a polygonal shape having a desired (or alternatively, "predetermined") radius based on an entity capable of inputting a location and/or position query of a pointer 320 (e.g., a mouse cursor or a finger and/or hand of a user).

The spot finder 310 may provide the user with target contents present within the spot finder 310, and may include a list of target contents 330 and a marker 340 configured to display a location and/or position of target content and perform a link functionality. Here, the term "marker" used herein may be interchangeably used with "target content" and the marker 340 may be explained as a marker of any target content found within the spot finder 310 without being limited to corresponding target content. Additionally, a marker may refer to an icon, pictogram, media file, and/or any other like indicator, which is used to mark or otherwise indicate a location and/or position of a target content on a map. It should be noted that the appearance of the marker may include any size, shape, color, or other like characteristic.

Accordingly, the spot finder 310 may also move based on the pointer 320 along the moving pointer 320, while maintaining a shape of the spot finder 310. The map service of example embodiments may change a display location and/or position of the map 100 in response to the pointer 320 being touched and dragged. A search location and/or position of the spot finder 310 may also be changed together with the pointer 320 of which a location and/or position is changed and thus, target contents to be searched may be changed. The target content list 330 and the markers 340 may be displayed based on real time information. According to example embodiments, the target content list 330 may be located outside the spot finder 310.

Target content may include or otherwise indicate location (or alternatively, "geolocation") coordinates. For instance, location (or alternatively, "geolocation") coordinates may specify a geographic coordinate (e.g., latitude and longitude) and/or a range of geographic coordinates, a Cartesian coordinate (e.g., Universal Transverse Mercator (UTM) coordinate system and/or Universal Polar Stereographic (UPS) coordinate system, and the like) and/or a range of Cartesian coordinates, a GPS coordinate (e.g., 38.803397, −77.06416; and the like) and/or a range of GPS coordinates, and/or a street address (e.g., 401 Dulany St., Alexandria, Va. 22314). When identifying a location query of the pointer 320, the spot finder 310 may indicate a location of coordinates of target content using the marker 340 and may also indicate a name of the target content in the target content list 330. In various embodiments, the location query may specify or otherwise indicate one or more location and/or geographic descriptions (e.g., Washington Monument, Potomac River, Shenandoah National Park, Atlantic Ocean, and the like). In various embodiments, the location query may specify or otherwise indicate a place and/or venue (e.g., a city and/or county, a neighborhood within a city or municipality, a business, a building, a floor within a building, and/or other like boundary encompassing a two-dimensional or three-dimensional shape).

In the target content list 330, information 331 on the number of target contents present within the spot finder 310 based on a real-time location and list information 332 of names of the target contents corresponding thereto are sorted. Referring to FIG. 3, ten target contents are found from the spot finder 310 and ten names corresponding thereto are sequentially sorted in the list information 332.

A name of target content proximate to a real-time location and/or position of the pointer 320 may be displayed on a top in the list information 332. In some embodiments, a name of target content that is most proximate to the real-time location and/or position of the pointer 320 may be displayed on a top in the list information 332. In addition, when sorting the list information 332, the target contents may be sequentially sorted in order of the target contents relatively proximate to a location and/or position of the pointer 320, for example, in ascending order of distances between the target contents and the pointer 320. The target content displayed on a top in the list information 332 may be expressed using a bold character or a different color, and may be involved in the marker 340 performing a link functionality. It will be described later.

According to example embodiments, the list information 332 of the target contents may be categorized and thereby be sorted. For example, in the case of sorting the list information 332 based on a recommended restaurant category, restaurants and cafes registered to a map service as recommended restaurants within the spot finder 310 may be sequentially sorted in ascending order of distances between the registered restaurants and cafes and the pointer 320. Alternatively, in the case of sorting the list information 332 based on a real estate category, target contents such as shops, houses, and apartments having real estate sales information may be sorted in the list information 332 in ascending order of distances between the target contents and the pointer 320. Here, a category may be displayed as an upper level of a target content name.

Also, in the case of performing a search using the spot finder 310 by separately including a category selecting function in the map service, target contents corresponding to a category may be expressed using the markers 340. Similarly, by counting the number of target contents present within the spot finder 310, by expressing the counted number of target content as the information 331 and by sorting the corresponding target contents, the target contents may be provided as the list information 332. For example, in the case of setting a search for target content including social networking service (SNS) information, only target content including an SNS for providing coupon information, information on reviews of a recommended restaurant, and the like may be found using the marker 340 and be displayed in the target content list 330.

As described above, in the case of collecting and processing target content data within the spot finder 310 in real time, according to various embodiments, a hashing algorithm based on one or more coordinates may be executed. The hashing algorithm may be generated as a function equation using a coordinate value of target content and a coordinate value of the pointer 320 and may be used to process data.

According to example embodiments, the radius of the spot finder 310 may be provided regardless of up-scaling or down-scaling the map 300. Through up-scaling and down-scaling of the map 300, a target content list included in the radius of the spot finder 310 may be displayed on a portion of the map 300 using a scroll or a corresponding function.

According to example embodiments, the spot finder 310 may be effectively used to search for target content located at a desired (or alternatively, "predetermined") location and/or position rather than to search for desired (or alternatively, "predetermined") target content.

Figure 4:
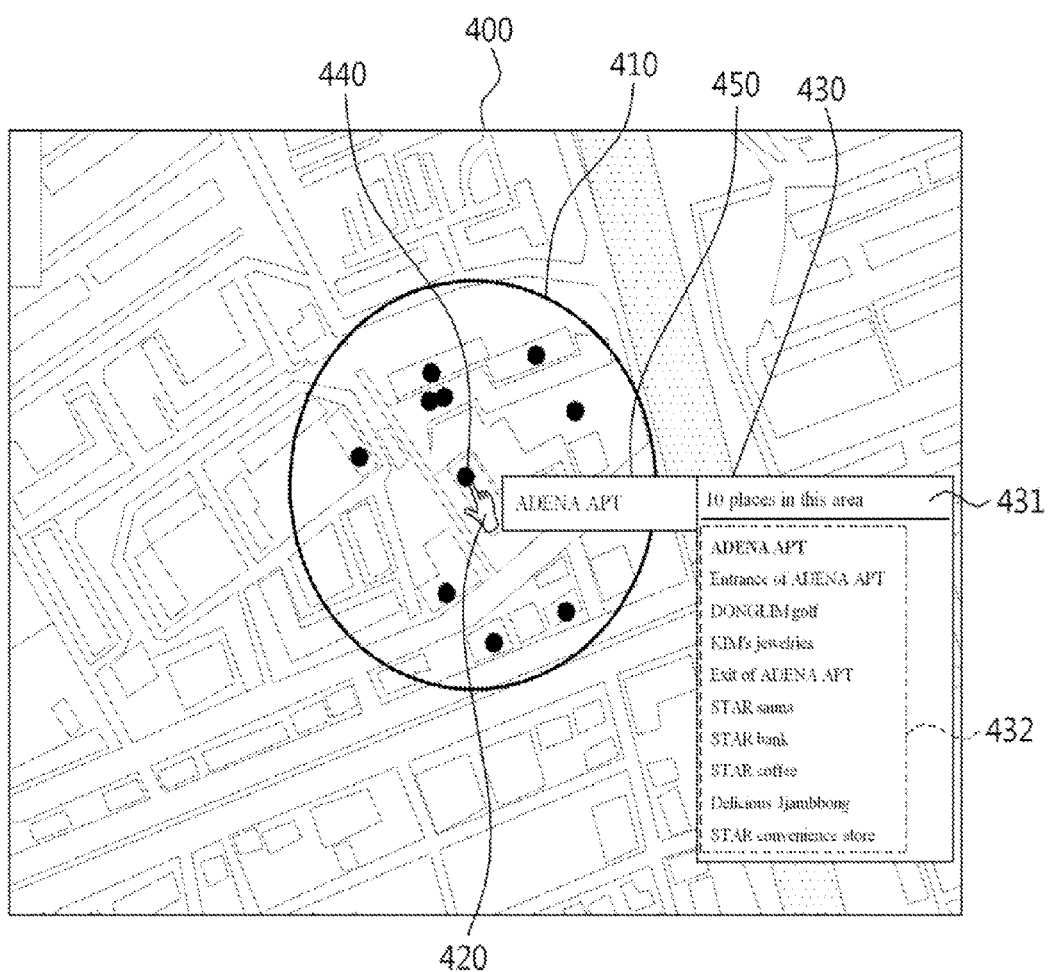
FIG. 4 illustrates an example of displaying a name of target content by rolling a pointer over a marker according to example embodiments.

FIG. 4 illustrates another example of providing a map service according to example embodiments. Referring to FIG. 4, a spot finder 410 having a predetermined radius is generated on a map 400 based on a pointer 420. Similar to FIG. 3, in the case of providing a target content list 430 present within the spot finder 410, the target content list 430 including information 431 on the number of target contents found in response to a location query and list information 432 of the target contents corresponding thereto may be displayed on the map 400.

Here, the pointer 420 may be an entity of executing and/or following a link function of a marker 440 indicating a location and/or position of target content. Accordingly, the map service may be provided in a rollover form in which a name 450 of corresponding target content is displayed in response to the pointer 420 placed on or passing the predetermined marker 440.

According to example embodiments, the name 450 of target content may match a name of target content proximate to the pointer 420, which is displayed on a top of the list information 432 using a bold character or a different color (not shown). In some embodiments, the name 450 of target content may match a name of target content that is most proximate to the pointer 420, which is displayed on a top of the list information 432 using a bold character or a different color (not shown). The name 450 of target content may be configured to display sketchy description (e.g., a telephone number or a rough address of the target content) in response to the pointer 420 being rolled over the marker 440.

When the pointer 420 is rolled over the marker 440, the pointer 420 may be changed to be in a linkable state of FIG. 4 from a state of the pointer 320 of FIG. 3. A link of the marker 240 will be further described with reference to FIGS. 3 and 4.

Figure 5:
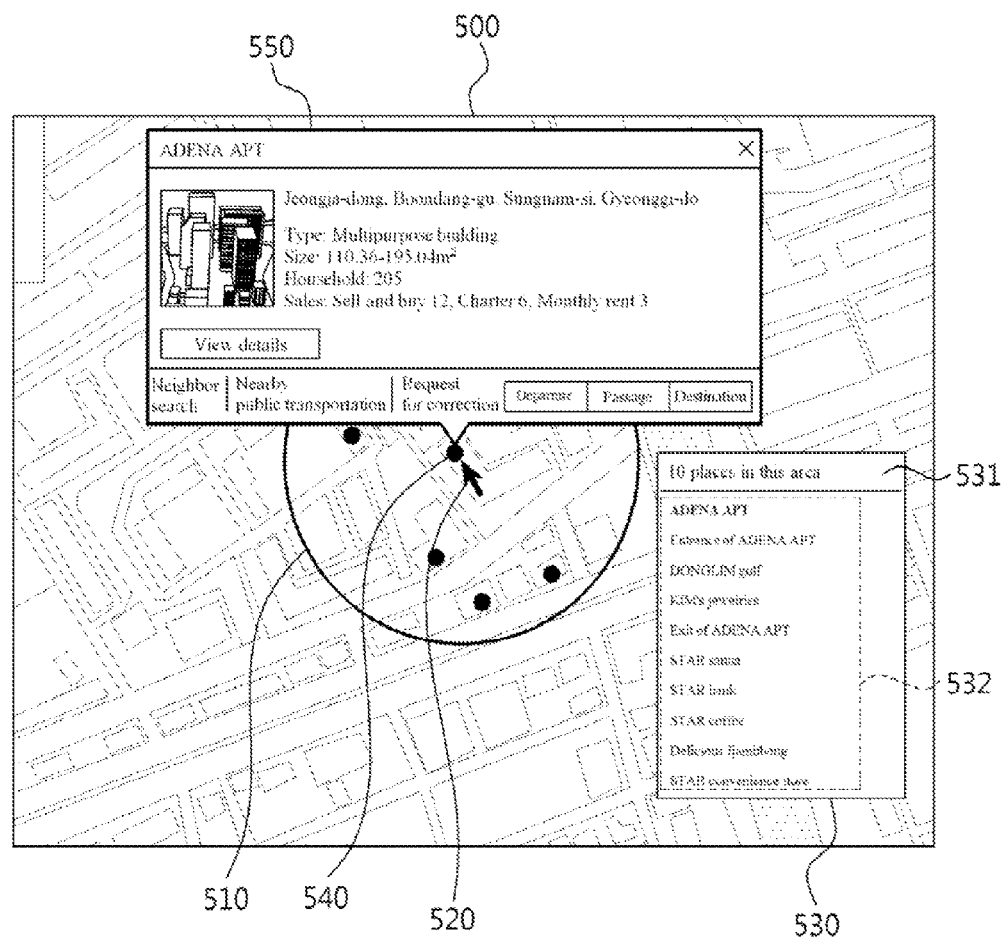
FIG. 5 illustrates an example of displaying real estate information as details of target content according to example embodiments.

FIG. 5 illustrates an example of executing and/or following a link of a marker 540 of target content according to example embodiments. Referring to FIG. 5, a spot finder 510 is provided on a map 500 based on a pointer 520. The spot finder 510 may indicate a location and/or position of target content present within the spot finder 510 using the marker 540, and may display a target content list 530 including information 531 on the number of target contents indicated using the markers 540 and list information 532 on names thereof on an outside of the spot finder 510.

The spot finder 510 may also provide details 550 associated with the target contents. According to example embodiments, a name displayed on a top of the list information 332 may refer to target content most proximate to the pointer 320 and the details 350 may be associated with the proximate target content.

The details 550 associated with the target content displayed on the top of the list information 532 may be provided or displayed in response to user input, such as a click and/or a tap of the pointer, regardless of whether the pointer 520 is rolled over the marker 540, which is a state of the pointer 420 of FIG. 4 or whether the pointer 320 does not overlap the marker 340, which is a state of the pointer 320 of FIG. 2. Alternatively, in the case of rolling the pointer 520 over the marker 540 for at least a predetermined period of time in a state linked thereto, the details 550 associated with the target content corresponding to the marker 540 may be displayed.

The details 550 may be displayed by popping up a window over the map 500, and may include basic information on the target content (e.g., a telephone number, an address, a website address, a photo, and the like). Alternatively, the details 550 may be displayed based on a category setting. For example, in a case in which a category is set as a real estate, sale information, a type of building and a building scale may be provided as the details 350.

Referring to FIG. 5, the details 550 may be real estate information. Here, required information may be verified by linking to sale information. If necessary, further information on the target content may be provided at a portal site by displaying the details 550 using a link. The details 550 may further include nearby public transportation information of the target content, road view, and the like. The map service according to example embodiments may include a path finding service. In this example, the details 550 may also provide a user with a link settable as a departure, a passage, or a destination.

Displaying of the details 550 may be terminated by a user input, such as moving the pointer 520 to another point on the map 500 or by clicking or tapping on an end button provided from the details 550.

Figure 6:
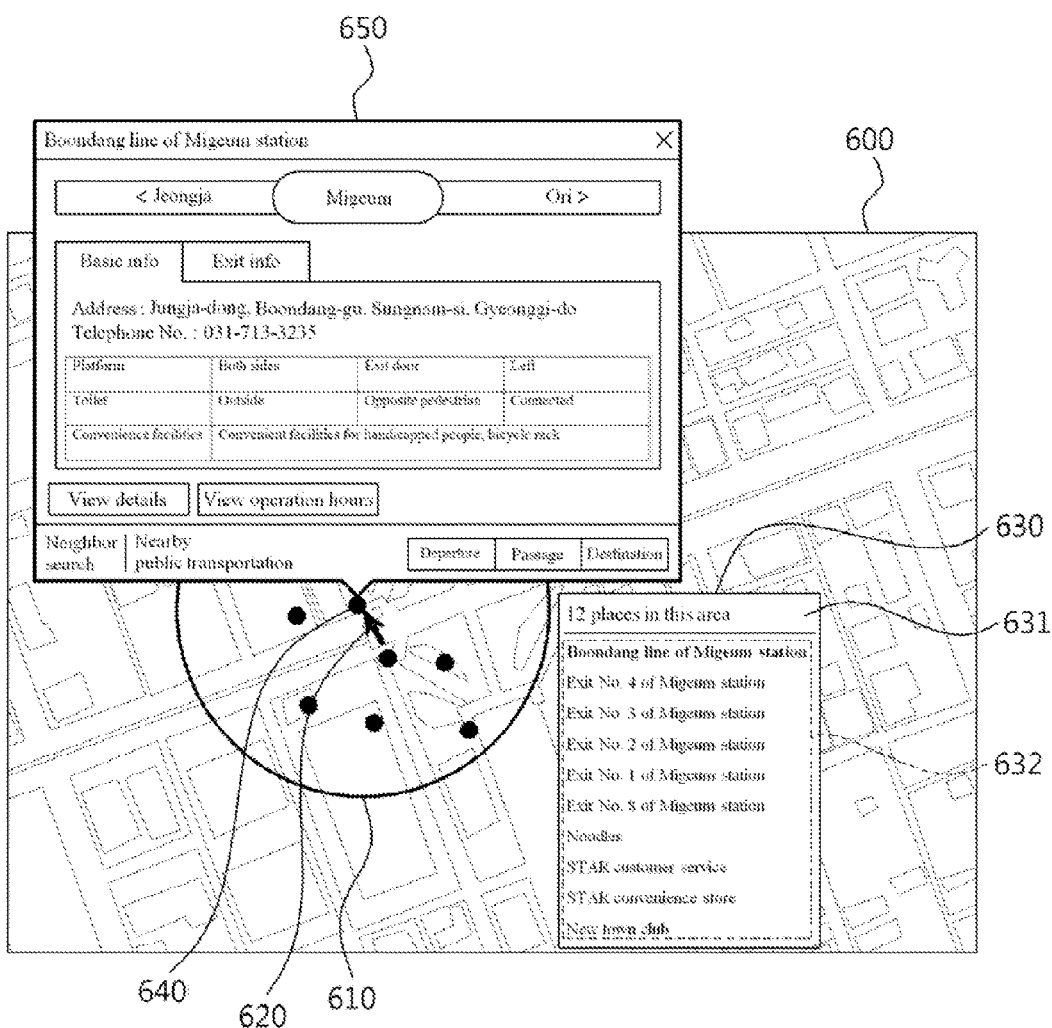
FIG. 6 illustrates an example of displaying public transportation information as details of target content according to example embodiments.

FIG. 6 illustrates an example of displaying public transportation information as details of target content according to example embodiments. Referring to FIG. 6, geography around a subway station is displayed on a map 600. A spot finder 610 may display a relatively large number of markers 640 with respect to target contents found based on a pointer 620 directing the subway station. Accordingly, a target content list 630 may include information 631 on the number of target contents around the subway station and list information 632.

As described above with reference to FIG. 5, in the case of the user input being a clicking or tapping on the marker 640 by approaching the pointer 620 to be most proximate to the marker 640 corresponding to the subway station or rolling the pointer 620 over the marker 640, details 650 associated with the subway station may be displayed for a user. Also, by rolling the pointer 620 over the marker 640 for at least a predetermined period of time, the details 650 associated with the marker 640 may be displayed.

The details 650 may relate to public transportation, for example, a subway station and thus, may include a line of the subway station, transfer information if the subway station is a transfer station, an address, an assistance call, nearby station information, and information used to use the subway station, such as a platform location, an opening door, a toilet location, convenience facilities in the subway station. The details 650 may provide a link such as "view details" and "view operation hours" so that a user may easily verify and/or determine subway operation hours and nearby public transportation information.

Description not made in FIG. 6 may refer to description made above with reference to FIG. 5.

Figure 7:
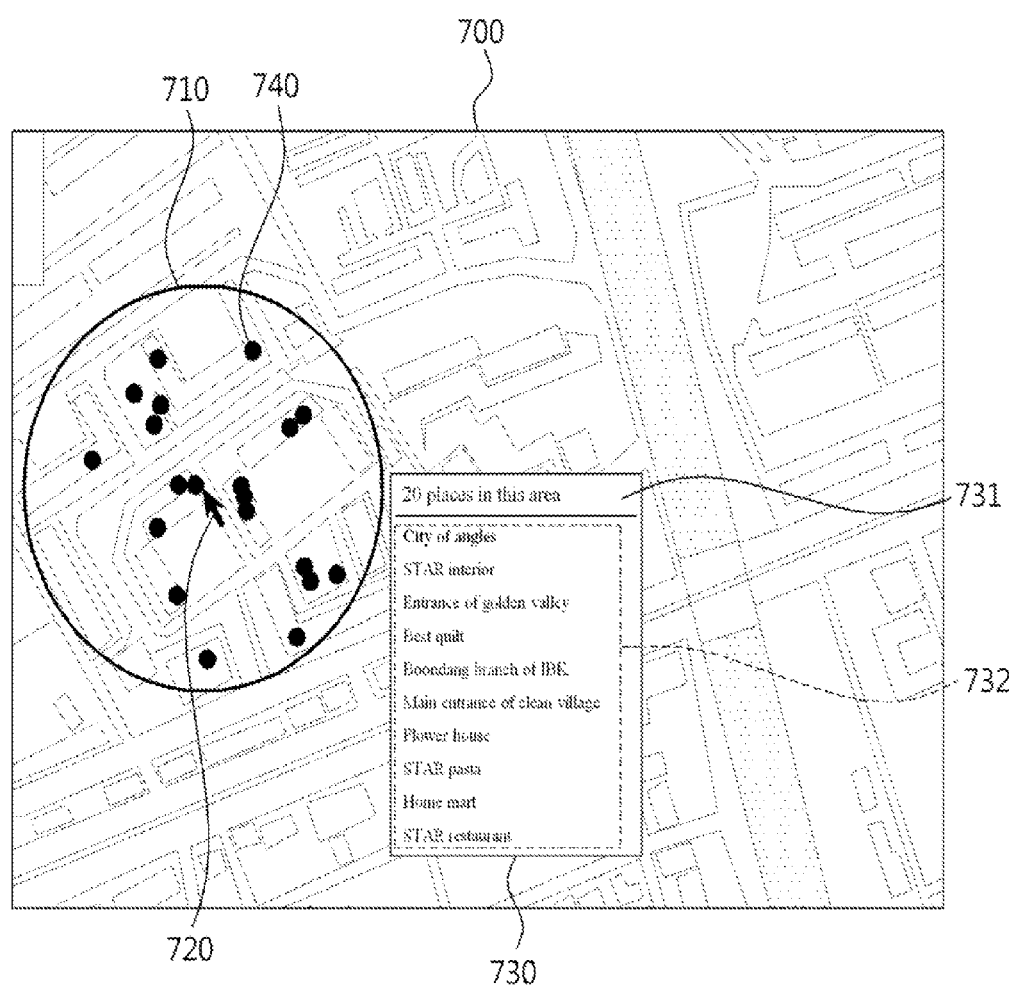
FIG. 7 illustrates an example of sorting a target content list when a relatively large number of target contents are acquired according to example embodiments.

FIG. 7 illustrates an example of sorting a target content list according to example embodiments.

A searching area of a spot finder 710 on a map 700 may be a main street in which shops and stores are densely located or an area in which a relatively large number of target contents are found. Referring to FIG. 7, a relatively large number of markers 740 are found. Accordingly, a target content list 730 may include information 731 on the number of target contents by counting the found target contents and list information 732 corresponding thereto.

In this example, when at least a predetermined number of target contents need to be input to the list information 732, a list of all the target contents may need to be displayed and thus, a user may have a degraded perception. In addition, a relatively large amount of time may be used to process data. Accordingly, a method of including a predetermined number of target contents in the list information 732 may be employed.

For example, only ten target contents relatively proximate to a pointer 720 that is a center of the spot finder 710 may be sorted in the list information 732. Alternatively, target contents frequently searched by users may be sorted in the list information 732. Here, information 731 on the number of target contents may be acquired by counting all the markers 740 found within the spot finder 710.

Similarly, in the example of FIG. 7, target content relatively proximate to the pointer 720 may be displayed on a relatively upper portion of the list information 732 in a target content list. Through this, an easy search map service may be provided even though a relatively large number of target contents are found.

Figure 8:
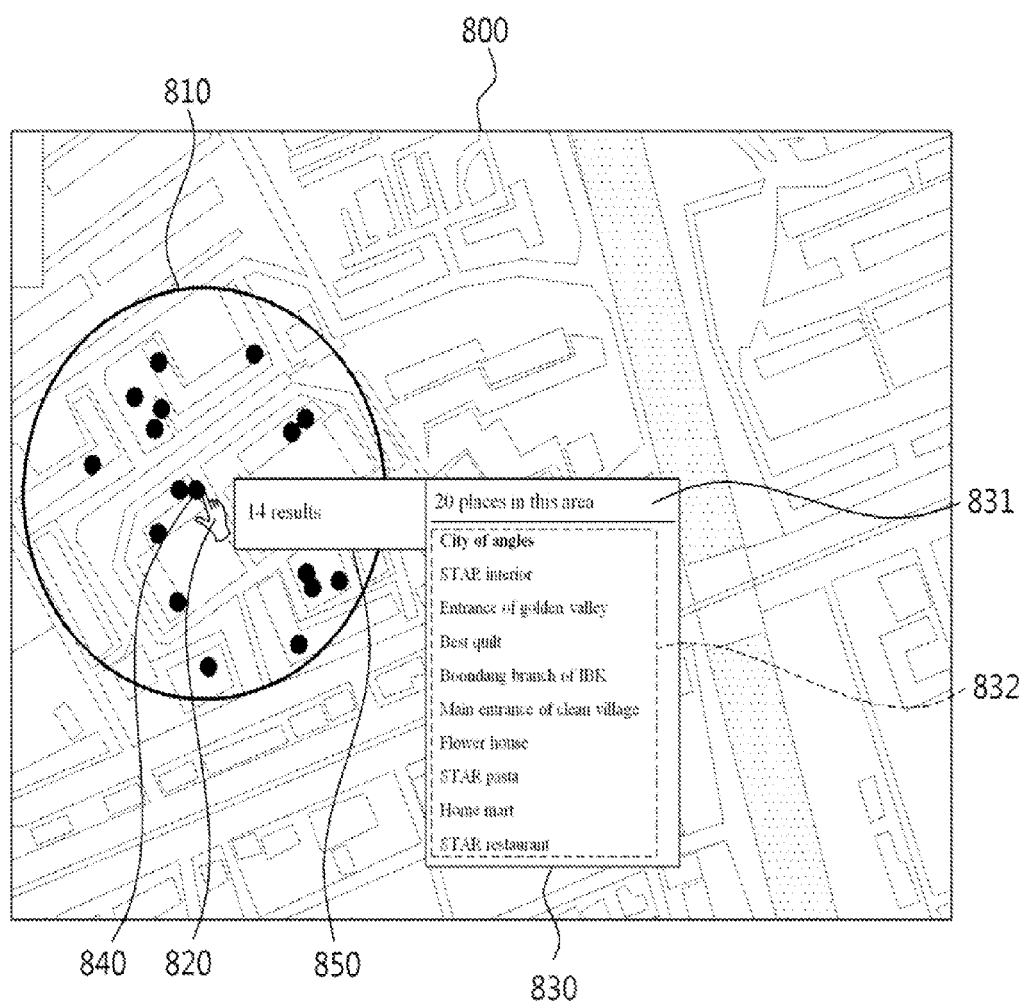
FIG. 8 illustrates an example of a shortcut marker present within a spot finder according to example embodiments.

FIG. 8 illustrates an example of providing a map service when overlapping markers of target contents are displayed as a shortcut marker according to example embodiments. The example of FIG. 8 may be provided in an area in which target contents are densely located.

Referring to FIG. 8, a plurality of target contents may be displayed within a spot finder 810 on a map 800. Information 831 on the number of target contents and list information 832 thereof may be included in a target content list 830. In the example of FIG. 8, 20 target contents may be present within the spot finder 810 and thus, only a predetermined number of target contents may be sequentially displayed using the list information 832 in order of the target contents relatively proximate to a location and/or position of a pointer 820, for example, in ascending order of distances between the target contents and the pointer 820. Additionally, in various embodiments, the sequentially displayed target contents may be updated or changed, in real-time, as the pointer changes location and/or position.

In this example, a marker 840 directed by the pointer 820 may be a shortcut marker for expressing a plurality of target contents located at the same coordinates. A guidance text 850 saying "14 results" may be displayed in response to the pointer 820 being rolled over the shortcut marker. The pointer 820 may be changed to be in a linkable state. In FIG. 8, 14 target contents correspond to the shortcut marker 840.

Figure 9:
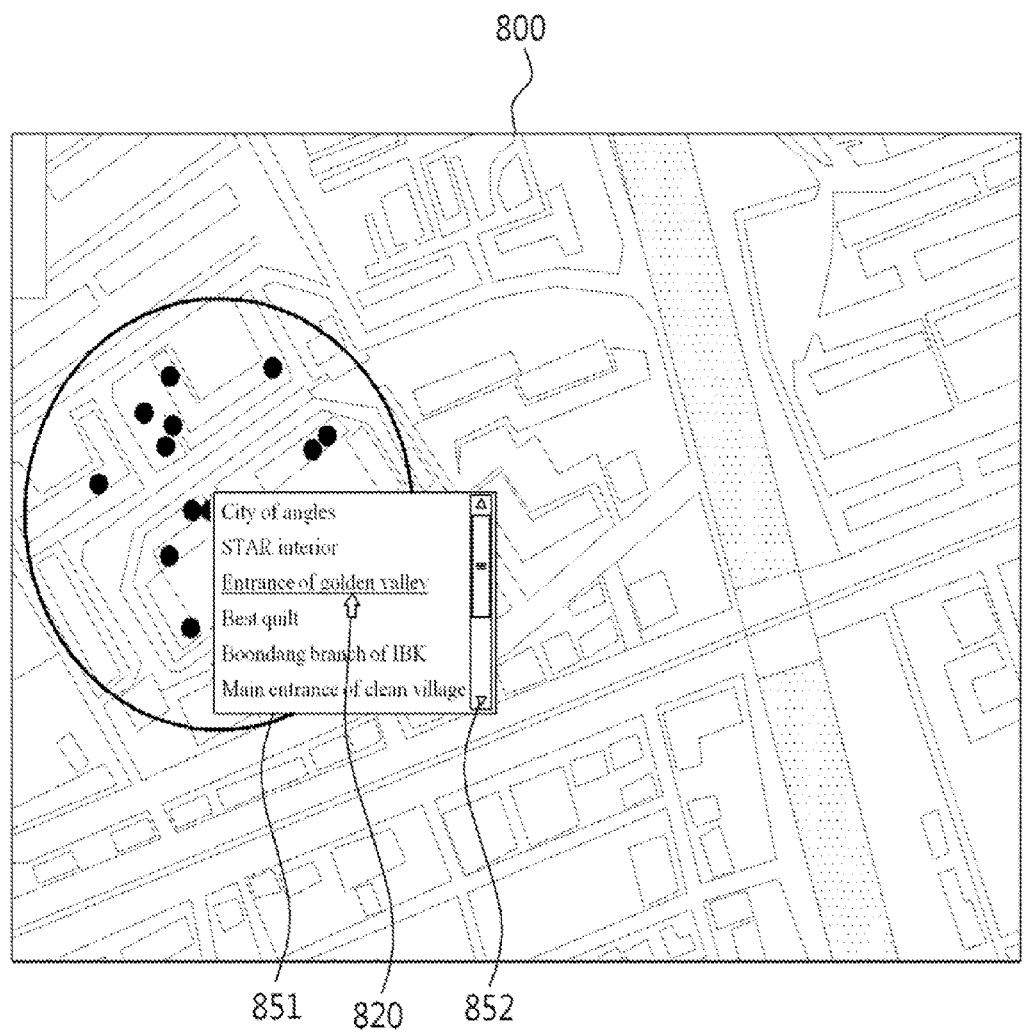
FIG. 9 illustrates an example of displaying target content using a shortcut marker of a spot finder according to example embodiments.

Through an user input and/or user operation of clicking or tapping on the pointer 820 to verify and/or determine the target contents corresponding to the shortcut marker 840, a target content list having the same coordinates of FIG. 9 may be verified.

Referring to FIG. 9, in response to a user input, such as a click or tap on the shortcut marker 840 including the guidance text 850, a selection window 851 displaying a list of all the target contents corresponding to the shortcut marker 840 may be displayed. All the target contents displayed on the selection window 851 may be in a linkable state in order to provide details such as an address and a telephone number through a link thereto. Accordingly, the pointer 820 may also be changed to be in a linkable state in the case of selecting a target content list on the selection window 851.

Also, in a case in which the number of target contents having the same coordinates is less than or equal to a predetermined reference value in a target content list, user perception may not be considered. In a case in which a large number of target contents have the same coordinates as illustrated in FIG. 9, names of the target contents present at the shortcut marker 640 may be displayed by scrolling using a scroll bar 852 or by clicking or tapping on an arrow indicator button when providing the selection window 851.

The target content list 830 may disappear when the selection window 851 is displayed. When a relatively large number of target contents are present at the shortcut marker 840, the list information 832 configured to display only a predetermined number of target contents may not include all the target contents corresponding to the shortcut marker 840.

Figure 10:
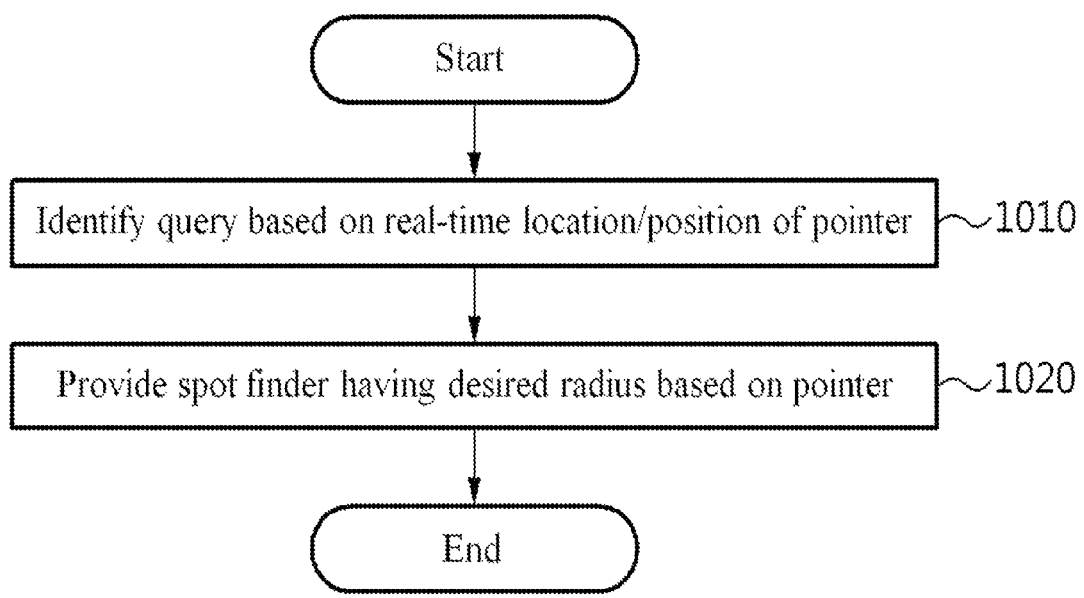
FIG. 10 is a flowchart illustrating a map service routine according to example embodiments.

FIG. 10 is a flowchart illustrating a map service routine 1000 according to example embodiments. The map service routine 1000 according to the example embodiments may be performed by a map service server 115 or other like computing device (e.g., a network element)

In operation 1010, the map service server 115 identifies a query based on a real-time location and/or position of a pointer. The example embodiments relate to searching for target content by using a location and/or position as an entity of a query instead of using a text keyword, and thus, an identified the real-time location and/or position of the pointer may be used to searching for target content.

In various embodiments, the pointer may become an entity of determining a location and/or position of a map. The location and/or position of the map may be changed by touching, tapping, and/or dragging the pointer. In addition, a change in the real-time location and/or position of the pointer may also be recognized by identifying a touch-and-drag operation.

In operation 1020, the map service server 115 provides a spot finder having a desired (or alternatively, "predetermined") radius based on the real-time location and/or position of the pointer. The spot finder may be provided in a circular or polygonal shape, and may correspond to a space for displaying target content found within the spot finder using a marker type link.

Each item of target content may include information on a name of the target content, coordinates, and/or other like information. In displaying such target content, markers within the spot finder and a target content list including the number of all the target contents found within the spot finder and names thereof may be displayed. When searching for target contents present within the spot finder, the target contents may be found and counted using a hashing algorithm based on the coordinates.

When displaying a target content list, a name of target content most proximate to the real-time location and/or position of the pointer may be displayed on a top of the target content list. The target content list may be sequentially sorted in order of the target contents relatively proximate to the pointer, for example, in ascending order of distances between the target contents and the pointer. That is, target content located to be relatively proximate to the pointer may be displayed on a relatively upper portion of the target content list.

The target content list may be categorized and/or sorted. For example, in the case of sorting the target contents based on a recommended restaurant category, restaurants and cafes registered to a map service as recommended restaurants within the spot finder may be sequentially sorted in ascending order of distances between the registered restaurants and cafes and the pointer. Alternatively, in the case of performing a search using the spot finder by separately including a category selecting function in the map service, target contents corresponding to a category may be expressed using markers.

As described above, target content may include name and coordinates information. Accordingly, in the case of rolling the pointer over a marker of the target content, the name may be displayed on the map. In this example, a state of the pointer may be changed from a normal state to a linkable state.

In operation 1020, the spot finder may provide details associated with the target content. A name displayed on a top of the target content list may relate to target content most proximate to the pointer and details may be associated with the proximate target content.

For example, details associated with a building may refer to information on an address, a telephone number, and nearby public transportation related to the building and thus, may include information on corresponding target content, for example, real estate information, SNS information, and recommended restaurant information. The details may include a link to move to a portal site in order to guide search results of the corresponding target content.

Also, in a case in which at least a desired (or alternatively, "predetermined") number of target contents need to be input to a target content list, a method of displaying list information associated with only the predetermined number of target contents may be employed instead of displaying a list of all the target contents. Here, the target contents may be sequentially sorted in order of the target contents relatively proximate to a location and/or position of the pointer (e.g., in ascending order of distances between the target contents and the pointer).

In a case in which at least two target contents are located at a single set of coordinates within the spot finder and thus, are expressed using a single shortcut marker when providing the spot finder in operation 1020, information on the number of target contents located at the same marker and having the same coordinates may be displayed in response to the pointer being rolled over the shortcut marker.

Accordingly, in addition to number information, a list of all the target contents corresponding to the shortcut marker may be displayed in response to a user input, such as a click or tap on the shortcut marker. Here, the target content list may be displayed for a user using a link to detailed description. When the number of target contents corresponding to the shortcut marker is greater than or equal to a predetermined reference value, a target content list may be displayed through scrolling using a scroll bar.

Description not made in FIGS. 8 and 9 may refer to description made above with reference to FIGS. 1 through 7.

According to example embodiments, it is possible to provide a user interface capable of clearly displaying target content by using a location and/or position as an entity of a query instead of using a text keyword to search a map provided on an electronic device.

Also, according to example embodiments, it is possible to provide a map service method and system that may prevent data from appearing as noise due to small icons deployed all over a displayed map, may increase a level of concentration about a region of interest through a user interaction, and may also enhance accuracy in displaying search results about a desired search location and/or position of the user.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

It will be apparent to those skilled in the art that various modifications and variation can be made in the example embodiments without departing from the spirit or scope of the example embodiments. Thus, it is intended that the example embodiments cover the modifications and variations of the example embodiments provided they come within the scope of the appended claims and their equivalents.

What is claimed is:

1. A map service method, the method comprising:
   identifying, by a processor, a pointer associated with a user device, the pointer indicating a position of the user device on a map; and
   providing, by the processor, a spot finder in response to a position of the pointer, the spot finder having a desired radius based on the position of the pointer; and
   providing, by the processor, a plurality of target contents in the desired radius in real-time, the target contents corresponding to at least one location within the desired radius, the target contents presented to the user in a list that is sorted based on at least one category of the target contents and a distance of the location from the position of the pointer.

2. The method of claim 1, wherein the location in the desired radius is defined by at least one of a coordinate of each of the target contents, a description of each of the target contents, and a venue of each of the target contents.

3. The method of claim 2, wherein a marker indicates the location in the desired radius.

4. The method of claim 1, wherein the desired radius is defined by a boundary encompassing at least one of a two-dimensional shape and a three-dimensional shape.

5. The method of claim 3, wherein the providing the target contents comprises:
   providing a name associated with each of the target contents in response to the pointer being proximate to the marker; and
   providing information associated with each of the target contents in response to receiving a user input associated with the marker, the user input including at least one of a click operation, a tap operation, a touch-and-drag operation, and the pointer being proximate to the marker for a desired period of time.

6. The method of claim 5, wherein the providing the information comprises:
   providing at least one link in response to receiving the user input, the link pointing to the information associated with each of the target contents; and
   providing the information associated with at least one of the target contents when the link is followed.

7. The method of claim 5, wherein the information associated with the target contents includes at least one detail related to each of the target contents, the at least one detail including at least one of an address, a telephone number, public transportation information, recommended restaurant information, real estate information, and social networking service (SNS) information.

8. The method of claim 1, wherein the providing the target content comprises:
   searching for target contents proximate to the spot finder using a hashing algorithm associated with the one or more locations.

9. The method of claim 1, wherein the plurality of target contents are in the desired radius, each of the plurality of target contents being associated with a corresponding location in the desired radius, and the providing the target contents comprises:
   providing a target contents list, the target contents list including a number of the plurality of target contents in the desired radius and a name of each of the target contents in the desired radius, the target contents list being provided in an area that is outside of the spot finder; and providing a name of one of the plurality of target contents that is most proximate to a position of the pointer when the position of the pointer is on the target contents list.

10. The method of claim 9, wherein providing the target contents list comprises:

generating a category for each of the plurality of target contents, each category including,
a user-defined setting, and
at least one of a recommended restaurant, a social networking service (SNS), and a real estate; and providing the target contents of the target contents list according to the user-defined setting.

11. The method of claim 9, wherein the providing the target contents further comprises:

determining that the number of target contents in the desired radius is greater than or equal to a desired reference value;

sequentially extracting target contents from the target contents list based on a proximity of each of the target contents of the target contents list to the position of the pointer, the amount of sequentially extracted target contents being equal to the desired reference value; and providing the sequentially extracted target contents.

12. The method of claim 9, wherein the target contents of the target contents list that are displayed on a top portion of the target content list are more proximate to the position of the pointer than the target contents of the target content list that are less proximate to the position of the pointer, and an amount of proximity of each of the target contents to the position of the pointer is expressed using at least one of a color or a bold font in the target contents list.

13. The method of claim 1, wherein the providing the spot finder comprises:

providing a shortcut marker when at least two target contents correspond to one location within the spot finder; and providing information of the at least two target contents that correspond to the shortcut marker when the position of the pointer is proximate to the shortcut marker; and providing a target contents list that lists the at least two target contents that correspond to the shortcut marker, each of the at least two target contents listed in the target contents list including a corresponding link that, when followed, provide information associated with each of the at least two target contents.

14. The method of claim 13, wherein, when the at least two target contents associated with the shortcut marker is greater than or equal to a desired reference value, the target contents list includes a scrolling function.

15. The method of claim 1, wherein the providing the spot finder comprises:

displaying a desired search location on the map according to a position of the pointer on the map using a touch-and-drag operation.

16. A non-transitory computer-readable recording medium storing program code for controlling a computer system to, when executed, implement a map service method, the method comprising:

identifying, by a processor, a position of a pointer associated with a user device, the pointer indicating a position of the user device on a map;

providing, by the processor, a spot finder in response to the position of the pointer, the spot finder having a desired radius based on the position of the pointer; and providing, by the processor, a plurality of target contents in the desired radius in real-time, the target contents corresponding to at least one location within the desired radius, the target contents presented to the user in a list that is sorted based on at least one category of the target contents and a distance of the location from the position of the pointer.

17. A map service server, the server comprising:

a processor configured to execute a query identifier to identify a pointer associated with a user device, the pointer indicating a position of the user device on a map; and the processor configured to execute a spot finder provider to
provide a spot finder in response to a position of the pointer, the spot finder having a desired radius based on the position of the pointer, and
provide a plurality of target contents in the desired radius in real-time, the target contents corresponding to at least one location within the desired radius, the target contents presented to the user in a list that is sorted based on at least one category of the target contents and a distance of the location from the position of the pointer.

18. The map service server of claim 17, wherein the location in the desired radius is defined by at least one of a coordinate of each of the target contents, a description of each of the target contents, and a venue of each of the target contents.

19. The map service server of claim 18, wherein a marker indicates the location in the desired radius.

20. The map service server of claim 17, wherein the desired radius is defined by a boundary encompassing at least one of a two-dimensional shape and a three-dimensional shape.

21. The map service server of claim 19, wherein, in the providing the target contents, the processor is further configured to:

provide a name associated with each of the target contents in response to the pointer being proximate to the marker; and provide information associated with each of the target contents in response to receiving a user input associated with the marker, the user input including at least one of a click operation, a tap operation, a touch-and-drag operation, and the pointer being proximate to the marker for a desired period of time.

22. The map service server of claim 21, wherein, in the providing the information, the processor is further configured to:

provide a plurality of links in response to receiving the user input, the links pointing to the information associated with the target contents; and provide the information associated with each of the target contents when the link is followed.

23. The map service server of claim 21, wherein the information associated with each of the target contents includes at least one detail related to each of the target contents, the at least one detail including at least one of an address, a telephone number, public transportation information, recommended restaurant information, real estate information, and social networking service (SNS) information.

24. The map service server of claim 17, wherein, in the providing the target contents, the processor is further configured to:

search for target contents proximate to the spot finder using a hashing algorithm associated with the one or more locations.

25. The map service server of claim 17, wherein the plurality of target contents are in the desired radius, each of the plurality of target contents being associated with a corresponding location in the desired radius, and in the providing the target content, the processor is further configured to:
provide a target contents list, the target contents list including a number of the plurality of target contents in the desired radius and a name of each of the target contents in the desired radius, the target contents list being provided in an area that is outside of the spot finder; and
provide a name of one of the plurality of target contents that is most proximate to a position of the pointer when the position of the pointer is on the target contents list.

26. The map service server of claim 25, wherein, in providing the target contents list, the processor is further configured to:
generate a category for each of the plurality of target contents, each category including,
a user-defined setting, and
at least one of a recommended restaurant, a social networking service (SNS), and a real estate; and
provide the target contents of the target contents list according to the user-defined setting.

27. The map service server of claim 25, wherein, in the providing the target content, the processor is further configured to:
determine that the number of target contents in the desired radius is greater than or equal to a desired reference value;
sequentially extract target contents from the target contents list based on a proximity of each of the target contents of the target contents list to the position of the pointer, the amount of sequentially extracted target contents being equal to the desired reference value; and
provide the sequentially extracted target contents.

28. The map service server of claim 25, wherein the target contents of the target contents list that are displayed on a top portion of the target content list are more proximate to the position of the pointer than the target contents of the target content list that are less proximate to the position of the pointer, and an amount of proximity of each of the target contents to the position of the pointer is expressed using at least one of a color or a bold font in the target contents list.

29. The map service server of claim 17, wherein, in the providing the spot finder, the processor is further configured to:
provide a shortcut marker when at least two target contents correspond to one location within the spot finder; and
provide information of the at least two target contents that correspond to the shortcut marker when the position of the pointer is proximate to the shortcut marker; and
provide a target contents list that lists the at least two target contents that correspond to the shortcut marker, each of the at least two target contents listed in the target contents list including a corresponding link that, when followed, provide information associated with each of the at least two target contents.

30. The map service server of claim 29, wherein, when the at least two target contents associated with the shortcut marker is greater than or equal to a desired reference value, the target contents list includes a scrolling function.

31. The map service server of claim 17, wherein, in providing the spot finder, the processor is further configured to:
display a desired search location on the map according to a position of the pointer on the map using a touch-and-drag operation.

* * * * *